US 6,590,869 B1

(12) United States Patent
Beyda et al.

(10) Patent No.: US 6,590,869 B1
(45) Date of Patent: Jul. 8, 2003

(54) METHOD AND APPARATUS FOR SELECTING WHETHER TO PLACE A CALL OVER THE INTERNET OR THE PSTN USING A TWO TIERED PROCESS

(75) Inventors: William J. Beyda, Cupertino, CA (US); Shmuel Shaffer, Palo Alto, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/267,890

(22) Filed: Mar. 11, 1999

(51) Int. Cl.⁷ .......................... G01R 31/08; H04L 12/66
(52) U.S. Cl. ....................................... 370/248; 370/353
(58) Field of Search .............................. 370/276, 277, 370/282, 285.6, 289, 351, 352, 353.6, 389, 248, 249, 250

(56) References Cited

U.S. PATENT DOCUMENTS

| | | | | |
|---|---|---|---|---|
| 5,317,562 A | | 5/1994 | Nardin et al. ................. 370/16 |
| 5,521,910 A | | 5/1996 | Matthews ..................... 370/54 |
| 5,608,786 A | * | 3/1997 | Gordon ....................... 358/402 |
| 5,737,395 A | * | 4/1998 | Irribarren ............... 379/100.01 |
| 5,818,836 A | * | 10/1998 | DuVal ......................... 370/352 |
| 6,134,235 A | * | 10/2000 | Goldman et al. ........... 370/352 |
| 6,253,249 B1 | * | 6/2001 | Belzile ........................ 370/259 |
| 6,259,691 B1 | * | 7/2001 | Naudus ....................... 370/352 |
| 6,282,192 B1 | * | 8/2001 | Murphy et al. ............. 370/238 |
| 6,360,271 B1 | * | 3/2002 | Schuster et al. ............ 370/516 |

OTHER PUBLICATIONS

Stalligs, William, High-Speed Networks, 1998, Prentice-Hall, Inc., pp. 225, 248–261.*

* cited by examiner

Primary Examiner—David Vincent

(57) ABSTRACT

A method and a system for handling calls includes utilizing a delay calculation module to calculate a transmission delay between first and second terminals over a voice-over-data-network, such as the Internet. A local call processor determines if the transmission delay exceeds a predetermined threshold. If the threshold is exceeded, voice transmission quality over the Internet is not sufficient to support high quality transmissions for the call and a call router places the call over an alternate network, such as a Public Switch Telephone Network (PSTN). In a preferred embodiment, the transmission delay calculation is a two-tiered process in which a preliminary round trip delay is first calculated to screen for large transmission delays which do not include a delay component introduced by a remote call processor. If the preliminary round trip delay exceeds a round trip delay threshold, the call is routed over the PSTN. If the preliminary round trip delay falls within a predetermined range below the threshold, the delay calculation module calculates an end-to-end echo which includes a delay introduced by the remote call processor. If the end-to-end echo is below an end-to-end echo delay, the call is routed over the Internet. Otherwise, the call is routed over the PSTN. After a call is routed over the Internet, the round trip delay and the end-to-end echo are monitored and the call is transferred if either the round trip delay or the end-to-end echo exceeds its respective threshold.

15 Claims, 2 Drawing Sheets

METHOD AND APPARATUS FOR SELECTING WHETHER TO PLACE A CALL OVER THE INTERNET OR THE PSTN USING A TWO TIERED PROCESS

BACKGROUND OF THE INVENTION

The present invention relates to a method and a system for handling calls within communications networks and, more specifically, to dynamic routing and rerouting of Internet Protocol (IP) telephony calls.

DESCRIPTION OF THE RELATED ART

In conventional analog telephony over a Public Switch Telephone Network (PSTN), when a caller makes a call, he or she receives a dial tone from a central office upon taking a telephone off-hook. When the caller dials from the telephone after receiving the dial tone, the telephone typically utilizes Dual Tone Multifrequency (DTMF) tones to communicate the telephone number of the called party to the central office. A DTMF register at the central office processes the DTMF tones to obtain the called party's telephone number. The central office does not dedicate a DTMF register to each local loop to its customers, because of the high cost of doing so. As a general rule, at any one time, the number of incoming calls to the central office is substantially below the number of local loops to customers. Consequently, the local loops can share DTMF registers.

On occasions, the volume of incoming calls will reach a higher level than the central office is equipped to handle. In this case, if a caller goes off-hook, the caller will receive no dial tone from the central office, because there are no DTMF registers available to process the DTMF tones. However, once the caller does get a dial tone and establishes a connection, the volume of traffic through the central office does not affect the quality of voice transmission over the call, since the lines which comprise the transmission path for the call are dedicated lines. That is, there is no competition for bandwidth on the transmission path.

In an Integrated Services Digital Network (ISDN), a Basic-Rate Interface (BRI) provides a caller with two B-channels which are utilized to carry digitized voice and data while a single D-channel is utilized for signaling and low speed data transmission. A Primary-Rate Interface (PRI) provides a higher bandwidth service for business users. The PRI consists of either twenty-three or thirty B-channels for user data and a single D-channel for signaling. The D-channel which carries all signaling information differentiates ISDN telephony from conventional analog telephony, which carries both voice and signaling information over the same channel. However, voice information in ISDN telephony is carried to and from PSTN central offices over dedicated local loops in the same way that voice information is carried in analog telephony.

In recent years telephony has been implemented on open data networks such as intranets and the Internet to provide a viable alternative to conventional analog and digital telephony. Transmission of signaling data and voice information on such open networks is typically performed utilizing Internet Protocol (IP). One feature which poses unique challenges in IP-telephony is that the signaling information and voice information are carried over shared media. (consequently, as traffic on an IP-telephony enabled network increases, the bandwidth available for transmission of voice information decreases. Decreased bandwidth availability often results in transmission delays in the network. The transmission delays can be particularly disruptive in telephone calls because effective communication depends on substantially real-time transmission and presentation of voice information. As delays begin to exceed the level of 100 milliseconds, effective communication sharply declines.

If a caller is able to determine the traffic level of a data network at the time that a call is placed and the caller has an alternative means for placing the call to the called party (e.g., conventional connectivity via the PSTN), then the caller can avoid establishing a poor connection over the data network during high traffic intervals on the data network. However, if the call is placed over the PSTN, the caller is committed to the PSTN call and must manually terminate the PSTN connection and establish a connection over the data network if traffic subsequently decreases over the data network.

What is needed is a method and system for enhanced flexibility with respect to responding to changing network conditions to enable efficient utilization of IP-telephony.

SUMMARY OF THE INVENTION

A method and an apparatus for handling calls include calculating a transmission delay over a voice-over-data network between first and second endpoints to determine whether the delay exceeds a predetermined delay threshold. The call is automatically routed over a network other than the voice-over-data network if the delay exceeds the delay threshold. The calculation of transmission delay is performed before the call is established and periodically during the call to allow the call to be dynamically rerouted in response to changes in transmission delay over the voice-over-data-network.

The apparatus includes a call processor located on a local communications network and connected to multiple trunks, each of which is connected to a different network. One of the networks is a data network, such as the Internet, ;and another is a Public Switch Telephone Network (PSTN). The call processor selects among the trunks to provide connectivity between local communication devices on the local network and remote communication devices, with the selections being based on the current transmission delay over the Internet. In a preferred embodiment, the communication devices are enabled for Internet Protocol (IP) telephony, as well as conventional telephony over the PSTN.

A delay calculation module calculates the Internet transmission delay between a calling and a called communication device when the call processor receives a call request from a particular local communication device to a particular remote communication device. In a preferred embodiment, the calculation of transmission delay is a two step process. First, round trip delay is calculated to determine the delay attributed to the traffic over the transmission path between the local and remote communication devices. The delay calculation module determines whether the round trip delay exceeds a round trip delay threshold in order to screen out connections that would be susceptible to large delays. If the round trip threshold is exceeded, a call router routes the call over an alternate network, such as the PSTN. Otherwise, the delay calculation module progresses to the second step of calculating an end-to-end echo of the system. This second calculation includes the delay introduced by a remote call processor which supports IP-telephony on the remote communication device. If the end-to-end echo exceeds an echo threshold, the call router places the call over the PSTN. The call is placed over the Internet as an IP-telephony call if neither the round trip delay nor the end-to-end echo threshold is exceeded.

In a most preferred embodiment, the second step of calculating the end-to-end echo is, conditional upon the measure of the round trip delay falling in a center range of three ranges. As previously noted, when the round trip delay is above the predetermined round trip delay threshold (i.e., is within an uppermost range heaving the threshold as its lower limit), the call is immediately routed over the alternate network. On the other hand, if the round trip delay is measured to be in a lowermost range, the call is immediately routed over the voice-over-data network. It is only when the round trip delay is measured to be in the center range that quality of communication via the voice-over-data network is considered questionable. Thus, the end-to-end echo is calculated an(i used as a second factor in selecting among the available networks.

After the call has been placed, the delay calculation module continues to monitor round trip delay and end-to-end echo over the Internet. After the call has been placed over the Internet, if either the round trip delay or the end-to-end transmission delay exceeds its respective threshold, the call is rerouted from the Internet to the PSTN. Delay is introduced into the call when it is transferred to the PSTN in order to make the transfer transparent to the callers. Similarly, if the call has been placed over the PSTN, the delay calculation module continues to monitor end-to-end echo over the Internet so that, if the end-to-end echo drops below its threshold, the call will be rerouted over the Internet. The end-to-end echo threshold can be configured by each caller so that each caller can establish a personal tolerance for transmission delays.

The call, routed over the Internet can be a data-sharing call which includes a shared graphics/text feature in addition to voice. If either the round trip transmission delay or the end-to-end echo exceeds its respective threshold, the call router reroutes the voice component of the call over the PSTN while maintaining the data component of the data-sharing call on the Internet.

DETAILED DESCRIPTION

Figure 1:
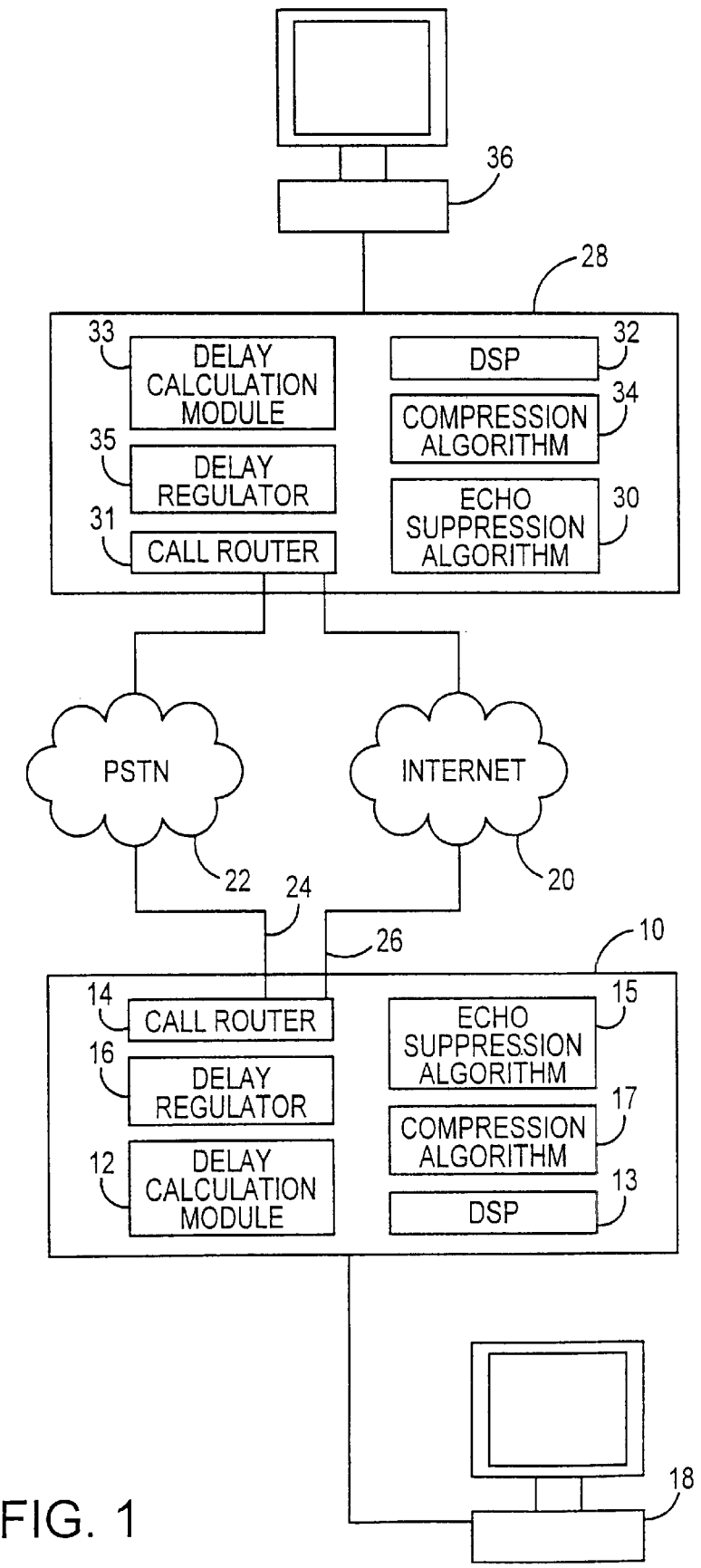
FIG. 1 is a block diagram of a call handling apparatus according to the present invention.

With reference to FIG. 1, a local call processor 10 is connected to multiple trunks, including a first trunk 24 which provides multiple communication devices with access to a Public Switch Telephone Network (PSTN) 22. Only one local IP-telephony terminal 18 is shown as being supported by the local call processor, but typically additional communications devices are connected to the local call processor. The local call processor 10 is also connected to a second trunk 26 which provides access to the global communications network known as the Internet 20. In the alternative, the second trunk 26 can he connected to an intranet (not shown). The local call processor 10 includes a delay calculation module 12 which determines transmission delay for transmissions over the Internet 20 to remote communication terminals, such as remote IP-telephony terminal 36, an echo suppression algorithm 15, a compression algorithm 17 for compressing voice information, and a digital signal processor 13 for performing analog-to-digital and digital-to-analog conversions of voice information. The local call processor 10 of the present invention can be adapted to operate in a number of different environments. In a first embodiment, the local call processor is located within a gateway or a call server on a data network (e.g., a Local Area Network). In a second embodiment, the local call processor 10 operates within a switch such as a central office or a Private Branch Exchange (PBX).

Routing telephone connections over a data network such as the Internet 20 provides potentially significant cost savings as compared to calls routed over the PSTN 22. For example, a long distance call which is routed over the PSTN 22 might incur long distance charges which are substantially higher than charges which are associated with routing a call to the same endpoint over the Internet 20. A primary concern with routing calls over the Internet 20 is quality of voice transmission. While IP-telephony can usually provide an acceptable quality of voice transmission to support standard person-to-person calls, the quality of voice transmission is not always sufficient to support a conference call or a call in which a speaker-phone feature is utilized. Furthermore, if network traffic is heavy, the voice transmission quality might be insufficient for even a standard person-to-person call. The present invention provides a means for monitoring an IP-telephony network and for dynamically routing and rerouting calls in response to changing network traffic conditions.

In a preferred embodiment, the delay calculation module 12 performs a two-tiered delay calculation. Initially, the delay calculation module 12 determines a preliminary round trip delay over the Internet 20 by transmitting a test data packet to a remote call processor 28 which is returned to the local call processor 10. The preliminary round trip delay calculation provides data regarding the transmission delay which results from network traffic on the transmission path between the local call processor 10 and the remote call processor 28. The remote call processor 28 does not perform any telephony-related processing on the test data packet, so the preliminary round trip delay calculation does not take into account the effect which the remote call processor 28 has on transmission delay over the Internet 20.

The delay calculation module 12 also performs an echo calculation by transmitting a test voice data packet to the remote call processor 28. The remote call processor 28 includes an echo suppression algorithm 30 to perform echo suppression, a Digital Signal Processor 32 (DSP) to perform voice coding and decoding, a compression algorithm 34 to perform compression and decompression of voice data, a call router 33 to selectively route outgoing calls over the PSTN 22 or the Internet 20, a delay regulator 35 to insert delay into calls transferred from the Internet 20 to the PSTN 22, and a delay calculation module 33 to determine transmission delay over the Internet 20. The remote call processor can be incorporated into a Telephony Internet Server (TIS) attached to a PBX or a central office of the PSTN 22. Alternatively, the remote call processor 28 can be incorporated into a gatekeeper associated with a gateway on a LAN.

The voice data test packet includes header information identifying it as a test packet, as well as a pattern of bits representing an actual voice signal. The header information alerts the remote call processor 28 to process the voice data test packet separately from voice data packets having embedded voice information which is part of a conversation. The test voice data packet is processed at the remote call processor by converting the voice data bits to analog signals, performing echo suppression, decompressing and recompensing the voice data, and reconverting the analog voice signals back to the digital format.

The remote call processor 28 then loops the voice data test packet back to the local call processor 10. The echo data that is calculated at the module 12 provides a more direct indication of voice transmission quality than the round trip delay data, because the echo data takes into account the impact which the remote call processor 28 has on voice transmission quality. Specifically, the echo data takes into account the impact of remote call processor functions (e.g., echo suppression, voice coding, and voice compression) upon voice transmission quality over the Internet 20.

The delay calculation module 12 compares round trip delay calculations to a predetermined delay threshold to determine whether to route a call over the Internet 20. If the measured round trip delay exceeds the delay threshold, then the voice transmission quality over the Internet 20 is determined to be too low to allow the call to be routed over the Internet 20. In a preferred embodiment, the delay calculation module 12 responds to delay measurements within a critical range by triggering the end-to-end echo calculation. The upper limit of this critical range of delay measurements is the delay threshold. Delay measurements within this critical range are inconclusive as to whether voice transmission quality will be sufficient to support voice communication over the Internet 20, since operations such as echo suppression at the remote call processor 28 may compensate for the delay. The effectiveness of echo suppression in the remote call processor 28 must be determined in order to decide whether to route a call over the Internet 20. If the calculated end-to-end echo exceeds a predetermined echo threshold, a call router 14 will route the call over the PSTN 22 rather than the Internet 20. In this preferred embodiment, if the round trip delay is below the critical range, the call router 14 routes the call over the Internet 20 without the delay calculation module 12 performing the end-to-end echo calculation.

After the call router 14 has routed a call over the Internet, it is possible that a subsequent increase in network traffic over the Internet 20 will decrease the voice transmission quality below an acceptable level. In response, the call router 14 transfers the call onto the PSTN 22. However, unless delay is introduced into the transferred call, the call will experience a loss of a time fragment which is equal to the difference in delays between the PSTN 22 and the Internet 20. A delay regulator 16 is included to intentionally introduce the delay into the call upon a transfer to the PSTN 22. The intentional delay is designed to prevent the loss of the time fragment after the call is transferred.

Figure 2:
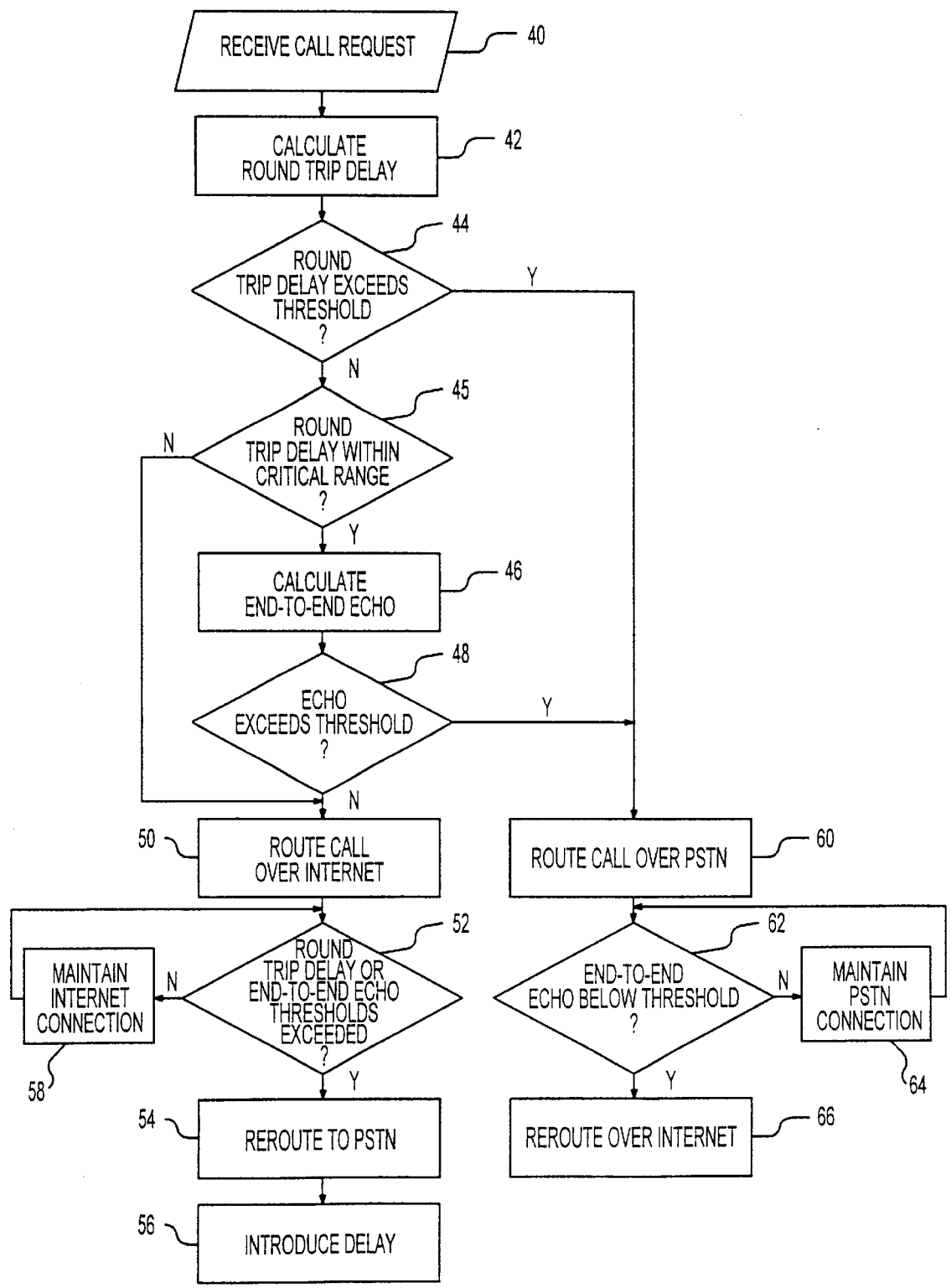
FIG. 2 is a process flow of a call handling method implemented by the call handling apparatus of FIG. 1.

With reference to FIGS. 1 and 2, a method for dynamically routing and rerouting calls in response to variations in network traffic over the Internet 20 includes receiving a call request at the local call processor 10 at step 40. The call request is generated by the local terminal 18, as it requests a connection to the remote terminal 36. At step 42, the delay calculation module 12 calculates the preliminary round trip delay for the transmission path between the local call processor 10 and the remote call processor 28. The round trip delay calculation involves transmitting a test data packet from the local call processor 10 and having the remote call processor 28 return the test data packet to the local call processor 10 without performing any telephony-related voice processing on the test data packet.

At steps 44 and 45, the delay calculation module 12 determines whether the calculated round trip delay exceeds a predetermined round trip delay threshold or is in a critical measurement range having the threshold as its upper limit. A calculated round trip delay calculation which is greater than the highest delay within the critical range triggers the call router 14 to automatically route the call over the PSTN 22 at step 60. It is not necessary to determine the echo suppression capabilities of the remote call processor 28 if the round trip delay exceeds the critical range because, by definition, a round trip delay in excess of the critical range indicates that the voice transmission quality of the Internet 20 cannot be made acceptable by corrective operations at the remote call processor 28.

If the calculated round trip delay is within the critical range, at step 46 the delay calculation module 12 calculates an end-to-end echo for the transmission path by sending a voice data test packet to the remote call processor 28. The voice data test packet includes a converted analog voice sample and a bit pattern within the header, identifying the packet as a test packet. The header information ensures that the voice sample test packet will not be processed as part of a conversation if the test packet is received at the remote call processor 28 during an on-going call. The bits representing the voice sample are decompressed by the compression algorithm 34, run through the DSP 32 at the remote call processor 28 to convert the voice sample to analog and then back to the digital format, processed by the echo suppression algorithm 30, and recompressed by the compression algorithm 34. The speed of the DSP 32, the strength of the voice compression algorithm 34, and the (effectiveness of the echo suppression algorithm 30 combine to impact the end-to-end echo.

In a preferred embodiment, if the preliminary round trip delay is below the critical range, the call router 14 routes the call over the Internet 20 at step 50 without the delay calculation module 12 performing an end-to-end echo test. No end-to-end echo test is required if the preliminary round trip delay is so low that the remote call processor 28 is unlikely to introduce sufficient delay into voice transmission that the voice quality becomes unacceptable. It is desirable to avoid performing the end-to-end echo test, if possible, because of the processing demands the end-to-end echo test places on remote call processor resources.

At step 48, the delay calculation module 12 determines whether the end-to-end delay exceeds a predetermined end-to-end delay threshold. If the threshold is exceeded, at step 60, the local call processor 10 routes the call to the PSTN 22. If the end-to-end echo threshold is not exceeded, at step 50, the call router 14 places the call over the Internet 20. After the call has been placed over the Internet 20, the potential exists that network traffic might increase during l:he call, so that voice transmission quality is no longer above the acceptable level. After the call has been placed, the delay calculation module 12 periodically performs round trip delay and end-to-end echo tests at step 52 to guard against degraded voice transmission quality. The tests are performed during a call in the same manner as they are performed prior to the ,call being established. The header information contained in the voice data test packet is important in end-to-end echo tests performed during a call to prevent the remote call processor 28 from processing the voice sample as part of the conversation.

If at step 52 either the round trip delay or the end-to-end echo exceeds its respective threshold during an IP-telephony call, the call router 14 transfers the call to the PSTN 22 at step 54. A concern associated with transferring an IP-telephony call from the Internet 20 to the PSTN 22 is the difference in transmission delays associated with the Internet and the PSTN. If the transmission delay difference is significant, there will be an interval of transmission lost during the transfer. The loss may be sufficiently large to be perceived by the users. In order to make the transfer transparent to the users, the delay regulator 16 introduces a delay into the call at step 56 which is approximately equal to the delay differential between the Internet 20 and the PSTN 22. After th(e call has been transferred, the delay calculation module 12 continues to monitor the round trip delay and end-to-end echo associated with the Internet transmission path between the local and remote terminals 18 and 36. If the end-to-end echo falls below its threshold, the call can be re-transferred to the Internet 20. The delay which was introduced into the call before it was transferred to the PSTN 22 is maintained, or increased if necessary, to make the transfer back to the Internet 20 transparent to both users.

Returning to step 52, for the entire time in which neither the round trip delay nor the end-to-end echo exceeds its respective threshold, the IP-telephony connection is maintained, as indicated by step 58. Thus, steps 52 and 58 form a loop.

In one embodiment, when the call is routed over the PSTN 22 at step 60 after decision step 44, the delay regulator 16 introduces a predetermined delay into the call in order to facilitate transparent rerouting of the call over the Internet 20. At step 62, the delay calculation module 12 determines whether the end-to-end echo falls below its respective threshold. If so, at step 66, the call router 14 transfers the call to the Internet 20. The delay which was introduced into the call at step 60 facilitates the transparent transfer of the call to the Internet 20. If the delay is not introduced into the call at step 60, a gap of silence which is equal to the delay differential between the PSTN 22 and the Internet 20 is introduced into the call after it is transferred to the Internet 20. If the end-to-end echo is above its threshold at step 62, the call is maintained on the PSTN connection at step 64, with steps 62 and 64 forming a loop.

The thresholds for round trip delay and end-to-end echo can be set by the user on each call or the user can rely on a threshold established by a system administrator. Furthermore, in a preferred embodiment, the delay calculation module 12 is configured to respond to different types of calls by applying different thresholds. For example, a conference call and a call which employs a speaker-phone feature both require a higher quality of voice transmission than a standard person-to-person call which does not employ the speaker-phone. The delay calculation module 12 applies more stringent thresholds for round trip delay and end-to-end echo to account for the quality of voice transmission required for conference calls and speaker-phone calls.

In another embodiment, the local call processor 10 is configured to support data sharing calls. If after a call is routed over the Internet 20 the round trip delay or end-to-end echo exceeds its threshold, the call router 14 will reroute the voice component of the data sharing call over the PSTN 22, while maintaining the data component of the call on the Internet 20.

The present invention makes it possible to efficiently take advantage of potential cost savings provided by IP-telephony by automatically routing or rerouting telephone calls over a data network, such as the Internet 20, when the quality of voice transmission over the Internet 20 meets minimum preset requirements. Conversely, when the quality of voice transmission falls below the minimum requirements, calls are automatically routed or rerouted over an alternate network, such as the PSTN 22. As a result, the need for acceptable voice transmission quality is balanced with the need to maximize potential cost savings.

What is claimed is:

1. A method for handling calls and call requests comprising the steps of:

selecting a delays threshold beyond which transmission delays over a voice-over-data-network are not to be exceeded;

calculating a transmission delay over said voice-over-data-network between call-specific first and second endpoints of each call of a plurality of said calls as said call requests are detected, said calculating being performed prior to each said call being established and being a two-tiered process which includes calculating a preliminary round trip delay which does not include a delay component contributed by a call processor and, if said preliminary round trip delay is within a predetermined range that is below said delay threshold, calculating an end-to-end echo which includes said delay component contributed by said call processor;

for each said call, determining whether said transmission delay exceeds said predetermined delay threshold; and automatically routing each said call between said call-specific first and said second endpoints over an alternate network other than said voice-over-data-network if said calculated transmission delay exceeds said delay threshold.

2. The method of claim 1 wherein said step of calculating said transmission delay includes calculating a delay introduced by a call processor which supports connectivity to said call-specific second endpoint.

3. The method of claim 1 further comprising the step of rerouting each said call from said alternate network to said voice-over-data-network if it is determined that said transmission delay over said voice-over-data-network falls below said predetermined threshold during said call.

4. The method of claim 1 further comprising the step of receiving a call request for ones of a speaker-phone call and a conference call from said call-specific first endpoint, said determining step including determining whether said transmission delay exceeds a transmission delay threshold for said one of said speaker-phone call and said conference call.

5. An apparatus for intelligently routing calls comprising:

a plurality of truck lines each connected to a different communications network, one of said networks being a voice-over-data-network; and a local call processor connected to said plurality of trunk lines to provide an interface between a plurality of local communication devices on a local communications network and said trunk lines, said local call processor including:

a) a delay calculation module connected to a voice-over-data-network trunk line to calculate transmission delay over said voice-over-data-network between one of said local communication devices on said local communications network and a remote communication device; and b) a call router responsive to a calculated delay over said voice-over-data-network in excess of a predetermined threshold to route a call between said local and said remote communication devices over an alternate trunk line other than said voice-over-data-network trunk line, said predetermined threshold being a stored indication of an acceptable level of transmission delay for routing said calls offer said voice-over-data-network, said call router being configured to reroute said call from said alternate trunk line to said voice-over-data-network trunk line in response to a detected delay below said predetermined threshold over said voice-over-data-network, said call router being operative while said call is in session, said call router further being configured to selectively reroute an audio component of a data-sharing call from said voice-over-data-network trunk line to said alternate trunk line while maintaining a data component of said data-sharing call on said voice-over-data-network call in response to said detected delay in excess of said predetermined threshold.

6. The apparatus of claim 5 wherein said delay calculation module is responsive to a call setup request from said local communication device to calculate said delay over said voice-over-data-network prior to said call being established.

7. The apparatus of claim 6 wherein said delay calculation module is configured to transmit a test voice data packet to be processed by a remote call processor in order to determine a delay component introduced by said call processor.

8. The apparatus of claim 6 wherein said delay calculation module is configured to periodically re-calculate said transmission delay after said call is established, said call router being configured to reroute said call from said voice-over-data-network trunk line to said alternate trunk line in response to detection of a transmission delay is in excess of said predetermined threshold, said call router being operative while said call is in session.

9. The apparatus of claim 8 further comprising a delay regulator connected to said delay calculation module and said call router to introduce delay into said call after said call has been rerouted to said alternate trunk line.

10. The apparatus of claim 5 wherein said local call processor is configured such that said predetermined threshold is set by a user of said local communication device.

11. A method for routing calls during call setup and rerouting said calls after said call setup comprising the steps of:

receiving a call setup request from a first terminal for a call directed to a second terminal; and selecting a route for said call using a two-tier process of:
(1) determining Internet suitability by:
a) calculating a transmission delay over an Internet Protocol (IP) telephony transmission path that is isolated from a delay component contributed by a call processor for processing said call;
b) ascertaining whether said transmission delay exceeds a first predetermined threshold; and
c) if said first predetermined threshold is exceeded, establishing said call over a non-IP network; and
(2) if said first predetermined threshold is not exceeded, determining end-to-end suitability by:
a) calculating an end-to-end echo between said first and second terminals so as to include said delay component contributed by said call processor;
b) ascertaining whether said end-to-end echo exceeds a second predetermined threshold;
c) if said second predetermined threshold is not exceeded, establishing said call over said IP-telephony transmission path; and
d) if said second predetermined threshold is exceeded, establishing said call over said non-IP network.

12. The method of claim 11 further comprising the steps of:

periodically monitoring said IP-telephony transmission path after said call has been established in step (c) to determine if said transmission delay exceeds said predetermined threshold; and rerouting said call over a non-IP alternate transmission path if said transmission delay exceeds said predetermined threshold.

13. The method of claim 12 wherein said step of rerouting said call includes introducing transmission delay into said call to make said rerouting step substantially transparent to users of said first and said second terminals.

14. The method of claim 11 wherein said step of establishing said call includes establishing a multimedia call, the method further comprising the step of selectively rerouting at least one component of said multimedia call over an alternate transmission path in response to a determination that said transmission delay has exceeded said predetermined threshold after said multimedia call has been established.

15. The method of claim 11 further comprising a step of enabling a user at said first terminal to set said predetermined threshold against which said transmission delay is compared to determine if said predetermined threshold is exceeded.

* * * * *